Figure 1:
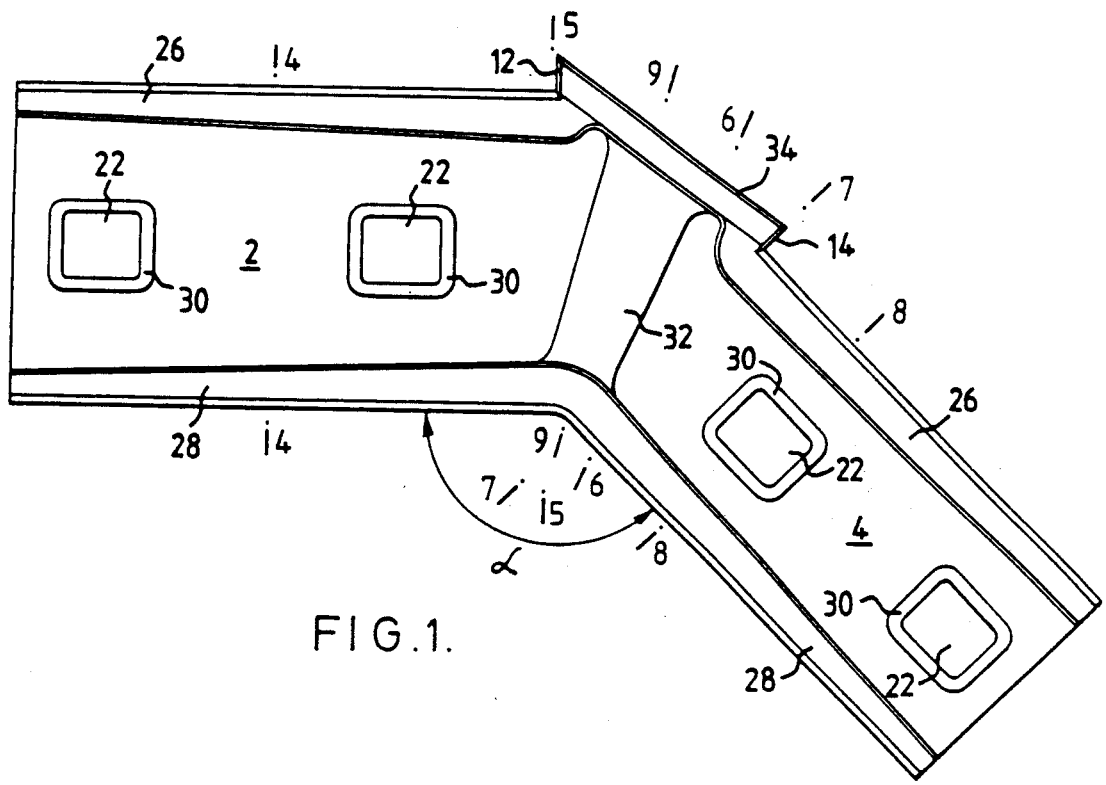

United States Patent [19]

Mason

[11] Patent Number: 4,988,232
[45] Date of Patent: Jan. 29, 1991

[54] JOINT MEMBERS

[75] Inventor: Benjamin Mason, Notts, England

[73] Assignee: Caledonian Mining Co., Ltd., United Kingdom

[21] Appl. No.: 355,982

[22] Filed: May 23, 1989

[30] Foreign Application Priority Data

Jun. 20, 1988 [GB] United Kingdom ............... 8814641

[51] Int. Cl.⁵ ............................................. B25G 3/36
[52] U.S. Cl. .................................. 403/403; 403/295;
403/402; 403/205; 405/288
[58] Field of Search ............... 403/403, 402, 401, 295,
403/205; 405/153, 288

[56] References Cited

U.S. PATENT DOCUMENTS 4,685,839 8/1987 Plater et al. .................... 403/403 X

FOREIGN PATENT DOCUMENTS 2189529 10/1987 United Kingdom ............... 405/153

Primary Examiner—Andrew V. Kundrat
Attorney, Agent, or Firm—Wood, Herron & Evans

[57] ABSTRACT

A joint member or fishplate intended to join together two lengths of I-Section beams at an angle one to the other. The fishplate comprising two arms including a predetermined angle and joined by a central portion having an outwardly projecting block, the sides of which extend outwardly perpendicular to the axes of the respective arms. This enables the mating ends of the two beams to be cut perpendicular to their axes and when joined together by a fishplate, the bottom flanges of the two beams abut or nearly abut and the top flanges are separated by a distance, depending upon the angle at which the beams are being joined, and which corresponds to the length of the outwardly projecting block. The ends of the top flanges of the beams then contact the sides of the outwardly extending block to form a strong joint.

8 Claims, 2 Drawing Sheets

JOINT MEMBERS

This invention relates to joint members and in particular to members, often referred to as "fishplates", used to join together two lengths of I-Section beams at an angle one to the other.

Hitherto the mating ends of the two I-Section beams have been cut at the desired angle and the fishplates, which are bolted to the web of the I-Section beams to join them, are formed with two arms extending from each other at the same desired angle. In the connected joint the cut end of the two beams abut each other.

Such an arrangement necessitates a cutting operation of the beam ends and the triangular portions cut off from the mating end of each beam is wasted.

A fishplate in accordance with this invention comprises two arms including a predetermined angle and joined by a central portion having an outwardly projecting block, the sides of which, adjacent the arms, extend outwardly perpendicular to the axis of the respective arms.

If then the mating ends of the two I-Section beams are cut perpendicularly to their axes, which saves material and cutting expense, and are brought together for joining at a desired angle, the bottom flanges of the two beams abut and the top flanges are separated by a distance depending on the angle at which the beams are being joined. A fishplate in accordance with the invention is then positioned on the webs of the beams, and the spaced top flanges of the beams then contact the sides of the outwardly extending block. The fishplate is then bolted through the webs of the beams and a strong and effective joint is formed.

Preferably two fishplates are used one positioned on each side of the two beams and bolted together through the beams.

In order for the fishplate to be as strong as possible without wastage of material it preferably has an I-Section, the flanges at each side of the section being so shaped and dimensioned as snugly to fit within the flanges of the I-Section beams to be joined. Thus there is additional material present adjacent the flanges where it is most needed. Preferably also the amount of material and hence the size of the "flanges" varies from a minimum amount at the outer extremity of the arms to a maximum at the central portion.

The I-Section shape enables the fishplate to be reversible, which is desirable, but if it was not thought necessary for it to be reversible then a flange at only one side of the section could be used.

A fishplate in accordance with the invention may be manufactured for example by forging or casting.

Figure 2:
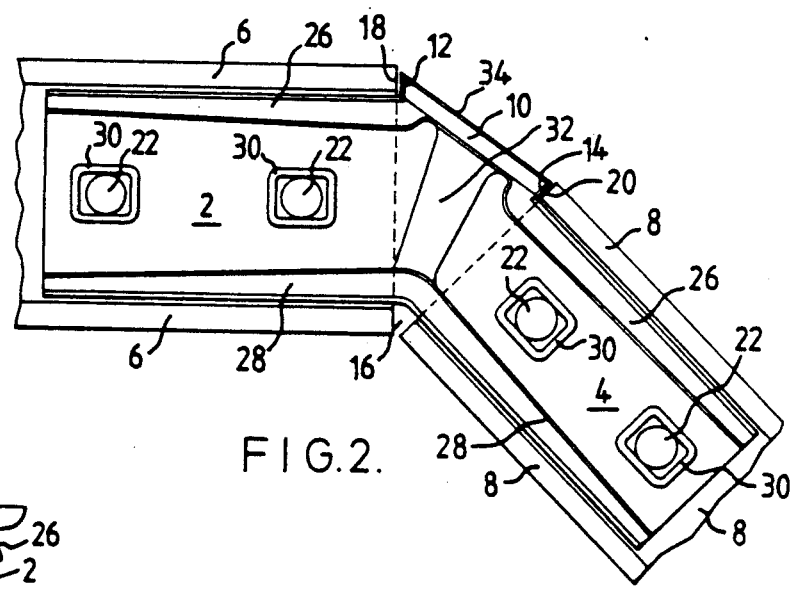
Figure 3:
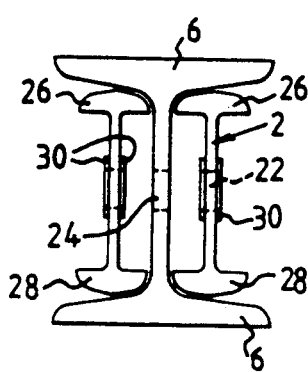
Figure 4:
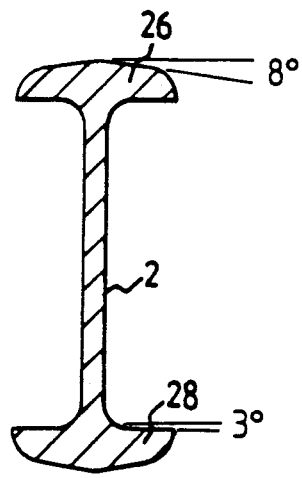
Figure 5:
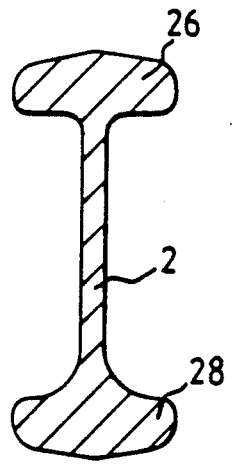
Figure 6:
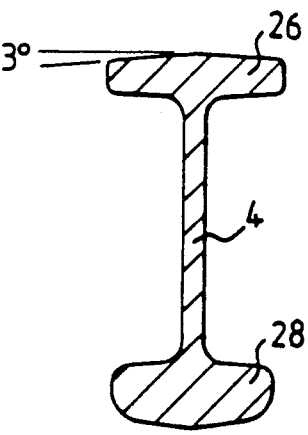
Figure 7:
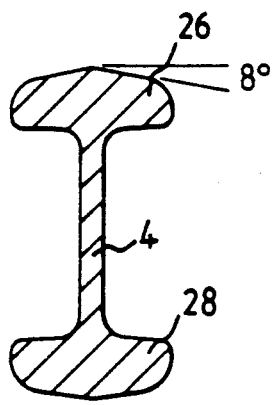
Figure 8:
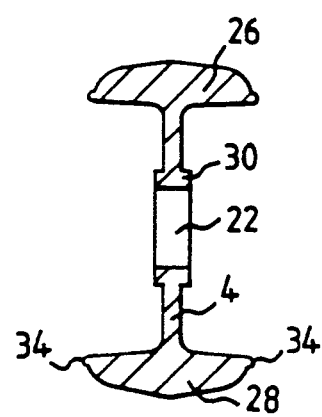
Figure 9:
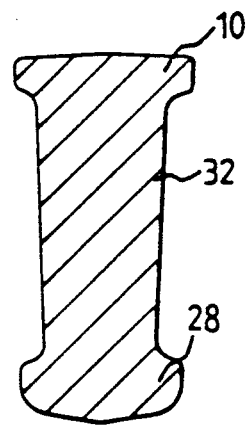
Figure 10:
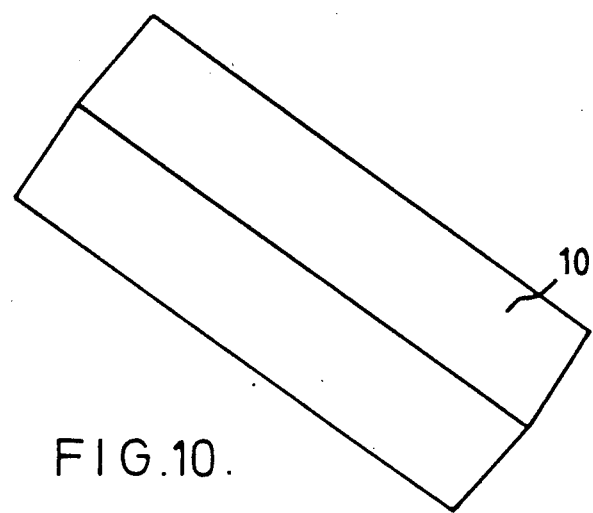

A fishplate in accordance with the invention will now be further described by way of example with reference to the accompanying drawings in which:

FIG. 1 is a side elevation of the fishplate,

FIG. 2 is a side elevation of the fishplate of FIG. 1 in use joining two I-Section beams, FIG. 3 is an end elevation of the lefthand side of FIG. 2, FIG. 4 is a section on the line A—A of FIG. 1, FIG. 5 is a section on the line B—B of FIG. 1, FIG. 6 is a section on the line C—C of FIG. 1, FIG. 7 is a section on the line D—D of FIG. 1, FIG. 8 is a section on the line F—F of FIG. 1, FIG. 9 is a section on the line H—H of FIG. 1, and, FIG. 10 is a view on the top face of a part of the fishplate shown in FIG. 1.

Referring to the drawings the fishplate comprises two arms generally indicated at 2 and 4 extending at an angle α one to the other which angle is predetermined by the desired angle to be present between the two I-Section beams to be joined by the fishplate. In the example illustrated in FIG. 2, two I-Section beams are generally indicated at 6 and 8 and may for example comprise the top and one side leg of a mine tunnel support arch.

The central portion of the fishplate between the two arms 2 and 4 is formed with an outwardly projecting block 10, the projecting side edges 12 and 14 of which are perpendicular to the axes of the two arms 2, 4 respectively.

As can be seen in FIG. 2 when the two I-Section beams 6 and 8 are arranged at the predetermined angle their lower flanges abut at the point 16 whereas the ends 18, 20 of their upper flanges are spaced apart by the width 'L' of the projecting block portion 10 of the fishplate, with the end 18 of the upper flange of the beam 6 abutting the surface 12 of the projecting block 10 of the fishplate and the end 20 of the upper flange of the beam 8 abutting the surface 14 of the block 10. This creates a very solid and rigid joint when the bolts are passed through the holes 22 of the fishplate and through corresponding holes 24 in the I-Section beams.

As can be seen for example in FIG. 3 the fishplate is dimensioned so as to fit snugly between the top and bottom flanges of the I-Section beam and normally a fishplate will be provided on each side of the web of the beams, as shown in FIG. 3, bolts connecting the two fishplates and the beam passing through holes 22, 24.

Thus a rigid and strong joint is produced without having to cut the mating ends of the two beams 6 and 8 at an angle.

The fishplates are formed with an I-Section as can be seen in FIGS. 3 to 8 and the amount of material present in the enlarged flanges 26, 28 of the fishplate increases from a minimum at the ends of the fishplate, as can be seen in FIG. 4, to a maximum at the central portion of the fishplate connecting the two arms as can be seen in FIGS. 5 and 9. The flanges 26, 28 are tapered as can be seen in FIG. 2 to increase the joint strength and to give more even stress distribution.

The amount of material in the projecting portion 10 of the fishplate is also tapered as can be seen in FIG. 7, which is a top view of the surface 34 of the block 10.

In this way the amount of material is the greatest at the point where the bending loads will be greatest.

The shape of the fishplate flanges 26, 28 is such as flanges 6 of the I-Section beams to be joined.

Stiffening flanges 30 surround each of the holes 22 on each side of the main web of the fishplate. A central web stiffener 32 extends across the fishplate between the two angled arms 2, 4. The depth of this central stiffener diminishes between the block 10 and flange 28 as can be seen in FIG. 9.

A small nipple 34 extends outwardly from the lowermost flange 28 as can be seen in FIG. 8. This nipple will be ground off when the fishplate is used with I-Section beams having a constant web thickness but if the web thickness should be thicker in one position adjacent the join or be thicker on one member than the other then the nipples will mate with the webs of the I-Section beams.

I claim that:

1. A fishplate for connecting two I-section beams, the mating ends of each beam being cut perpendicular to its axis, said fishplate comprising two arms connected together at a central position at an angle relative one to the other, said arms defining an inner corner and an outer corner, and an outwardly projecting block connected to said central portion, each end of said block defining a side oriented perpendicular to the axis of its associated arm, said arms and block being sized so that when said beams are joined with said fishplate the adjacent ends of one pair of flanges of said beams nearly abut at said inner corner and the adjacent ends of the other pair of flanges of said beams abut the respective adjacent sides of said block.

2. A fishplate as set forth in claim 1, said fishplate being of I-shaped cross-sectional configuration, said fishplate comprising flanges at each side of said fishplate that are shaped and dimensioned so as to fit snugly within said beam flanges.

3. A fishplate as set forth in claim 2, the size of said fishplate flanges each varying from a relative minimum amount at the outer extremity of each arm to a relative maximum at said central portion.

4. A fishplate as set forth in claim 3, said fishplate comprising a web stiffener extending between said fishplate flanges.

5. A fishplate as set forth in claim 1, said fishplate comprising a series of holes passing through said arms, said holes permitting said fishplate to be bolted to said beams.

6. A fishplate as set forth in claim 5, said fishplate comprising a stiffening flange surrounding each of said holes.

7. A fishplate as set forth in claim 4, said stiffener extending between said outwardly projecting block and said inner corner.

8. A fishplate as set forth in claim 7, the thickness of said web stiffener diminishing from a maximum adjacent said block to a minimum adjacent said inner corner.

* * * * *